(12) United States Patent
Brandt et al.

(10) Patent No.: US 8,541,143 B2
(45) Date of Patent: Sep. 24, 2013

(54) FUEL CELL SYSTEM AND PROCESS FOR OPERATING SAME

(75) Inventors: Samuel Brandt, Esslingen (DE); Richard Schmidt, Stuttgart (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 635 days.

(21) Appl. No.: 12/707,064

(22) Filed: Feb. 17, 2010

(65) Prior Publication Data

US 2010/0209789 A1 Aug. 19, 2010

(30) Foreign Application Priority Data

Feb. 19, 2009 (DE) .................... 10 2009 009 667

(51) Int. Cl.
*H01M 8/04* (2006.01)
(52) U.S. Cl.
USPC .......................... 429/429; 429/423; 429/434

(58) Field of Classification Search
None
See application file for complete search history.

(56) References Cited

U.S. PATENT DOCUMENTS

| 4,128,700 | A | 12/1978 | Sederquist |
| 6,994,931 | B2 * | 2/2006 | Ichikawa et al. ............... 429/429 |
| 7,132,184 | B2 * | 11/2006 | Ogino et al. ................... 429/425 |
| 7,422,810 | B2 | 9/2008 | Venkataraman et al. |
| 2003/0008183 | A1 | 1/2003 | Hsu |
| 2007/0202366 | A1 * | 8/2007 | Kim et al. ........................ 429/13 |
| 2008/0286614 | A1 | 11/2008 | Pearson |
| 2008/0318091 | A1 | 12/2008 | Kusnezoff et al. |

* cited by examiner

*Primary Examiner* — John S Maples
(74) *Attorney, Agent, or Firm* — McGlew and Tuttle, P.C.

(57) ABSTRACT

A process for operating a fuel cell system (1), especially in a motor vehicle. The fuel cell system (1) includes at least one fuel cell (3) as well as at least one reformer (2). To improve the possibility of warm start, a warm-holding mode, in which heat transfer takes place from the fuel cell (3) to the reformer (2), is activated after switching off the fuel cell system (1).

21 Claims, 2 Drawing Sheets

FUEL CELL SYSTEM AND PROCESS FOR OPERATING SAME

CROSS REFERENCE TO RELATED APPLICATIONS

This application claims the benefit of priority under 35 U.S.C. §119 of German Patent Application DE 10 2009 009 667.1 filed Feb. 19, 2009, the entire contents of which are incorporated herein by reference.

FIELD OF THE INVENTION

The present invention pertains to a process for operating a fuel cell system, especially in a motor vehicle. The present invention pertains, furthermore, to a fuel cell system.

BACKGROUND OF THE INVENTION

Fuel cell systems, as they can be used, for example, in motor vehicles, comprise at least one fuel cell and at least one reformer, whose reformate gas is used as an anode gas in the fuel cell.

In the state in which they are switched on, such fuel cell systems generate electric current, which can be made available to electric users, for example, of a vehicle. Essential components of the fuel cell system, for example, the reformer and the fuel cell, operate at a comparatively high temperature level during the operation. Cold start of the fuel cell system, i.e., running up the power of the fuel cell system from an ambient temperature, is associated with high thermal and chemical loads on the individual components of the fuel cell system. To keep such loads and an accompanying shortening of the service life of the system as low as possible, gentle and correspondingly lengthy cold start procedures can be carried out. A gentle cold start may require, for example, several hours. Such lengthy switch-on procedures are, however, usually of no interest for applications in vehicles.

SUMMARY OF THE INVENTION

The object of the present invention is to propose an embodiment for an operating process and for a fuel cell system that is characterized in that comparatively short start times are obtained for the fuel cell system with lower thermal and chemical loads, as a result of which a comparatively long service life shall be able to be obtained for the fuel cell system.

According to the invention, a process is provided for operating a fuel cell system. The process comprises providing the fuel cell system with at least one fuel cell as well as at least one reformer. The fuel cell is operated and a warm-holding mode is established in which heat transfer takes place from the fuel cell to the reformer and activating the warm-holding mode after the fuel cell system has been switched off.

According to another aspect of the invention, a fuel cell system is provided in a motor vehicle. The system comprises a fuel cell, a reformer and a control for operating the fuel cell system. The control is equipped or programmed for establishing a warm-holding mode, in which heat transfer takes place from said fuel cell to said reformer and activating the warm-holding mode after said fuel cell has been switched off.

The present invention is based on the general idea of maintaining essential components of the fuel cell system, such as the fuel cell and the reformer, at a temperature level suitable for a warm start for as long as possible. This suggestion is based on the discovery that warm start, which begins, consequently, for example, at a minimum operating temperature or at least in the vicinity thereof, entails markedly lower thermal and chemical loads for the essential components of the fuel cell system than does a cold start. In addition, the necessary start time can be considerably shortened, because the thermal and chemical effects to be taken into account in case of a warm start will be markedly weaker than in case of a cold start. Since such warm starts are much more gentle than cold starts, the fuel cell system will have a longer service life as a consequence.

The keeping warm of the reformer is achieved in the present invention by heat being transferred from the fuel cell to the reformer during the warm-holding mode. This suggestion is based on the discovery that the reformer loses its temperature much more rapidly with the fuel cell system switched off than the fuel cell. Substantially more heat is stored in the fuel cell than in the reformer. The temperature of the reformer can be maintained at a temperature level suitable for a warm start for a comparatively long period of time by a specific and metered heat transfer from the fuel cell to the reformer. At the same time, the temperature of the fuel cell likewise drops only slowly during this time, so that a temperature level that is suitable for a warm start can be also be maintained for the fuel cell for a comparatively long time. It is especially advantageous in this connection that heat that is present in the fuel cell system anyway, i.e., heat that does not have to be fed in from the outside, is used to keep the reformer warm.

The heat transfer to the reformer during the warm-holding mode is advantageously carried out such that the temperature of the reformer does not drop below a minimum warm start temperature of the reformer. In addition or as an option, provisions may be made for the heat transfer to be carried out during the warm-holding mode only until the temperature of the fuel cell has dropped below the minimum warm start temperature of the fuel cell. The residual heat being stored in the fuel cell can be optimally utilized in this manner in order to maintain a temperature level that makes possible the most rapid warm start possible for the fuel cell and for the reformer for the longest time possible.

According to another advantageous embodiment, the heat transfer from the fuel cell to the reformer can be carried out by means of an educt circuit, in which an educt circulates between the fuel cell and the reformer. In particular, paths, for example, lines and ducts can be used here, which are present in the fuel cell system anyway. The effort needed for embodying the heat transfer is thus comparatively low.

It is obvious that the above-mentioned features, which will also be explained below, can be used not only in the particular combination indicated, but in other combinations and alone as well without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
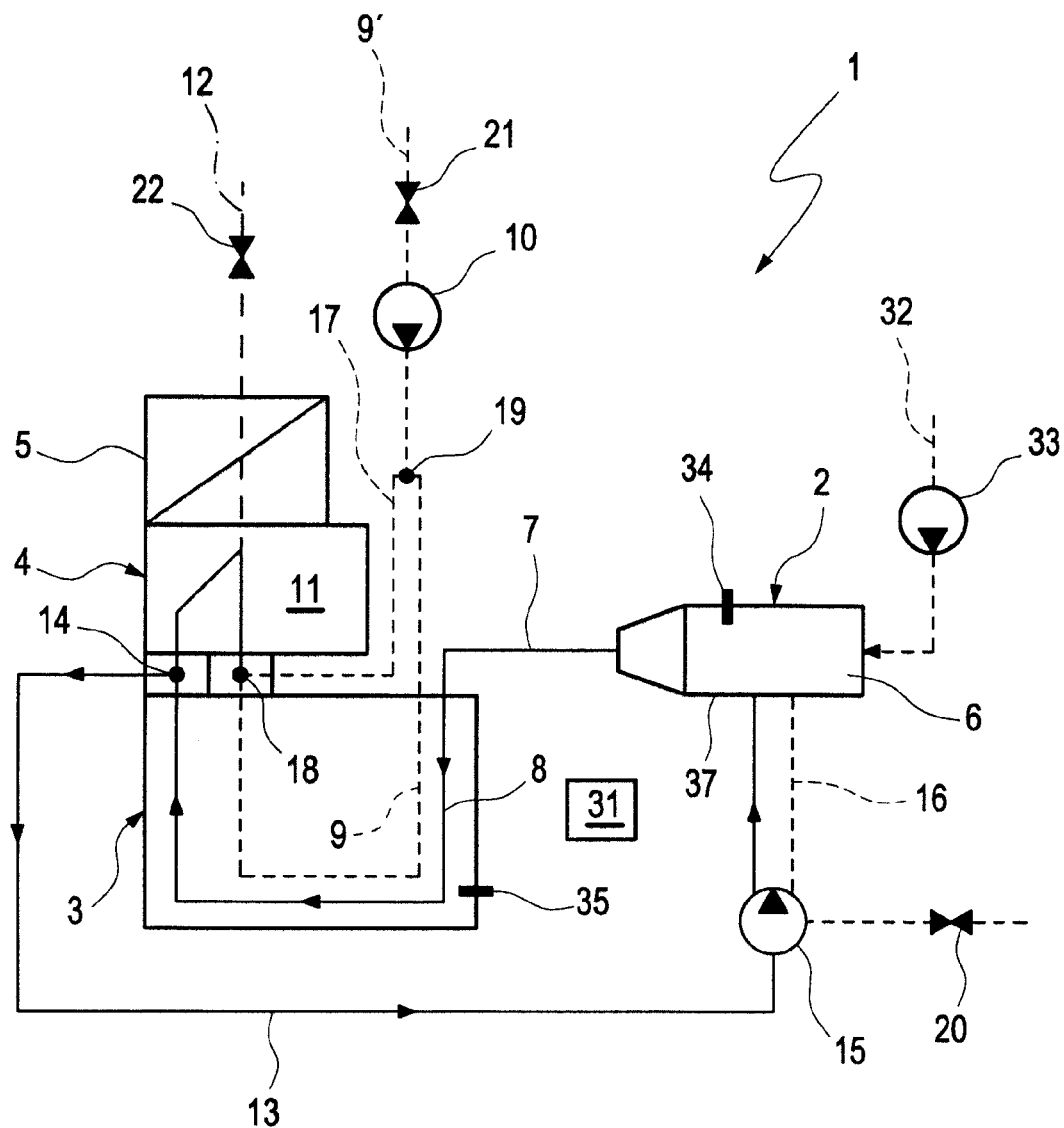
FIG. 1 is a highly simplified, circuit diagram-like schematic view of a fuel cell system of an embodiment according to the invention.
Figure 2:
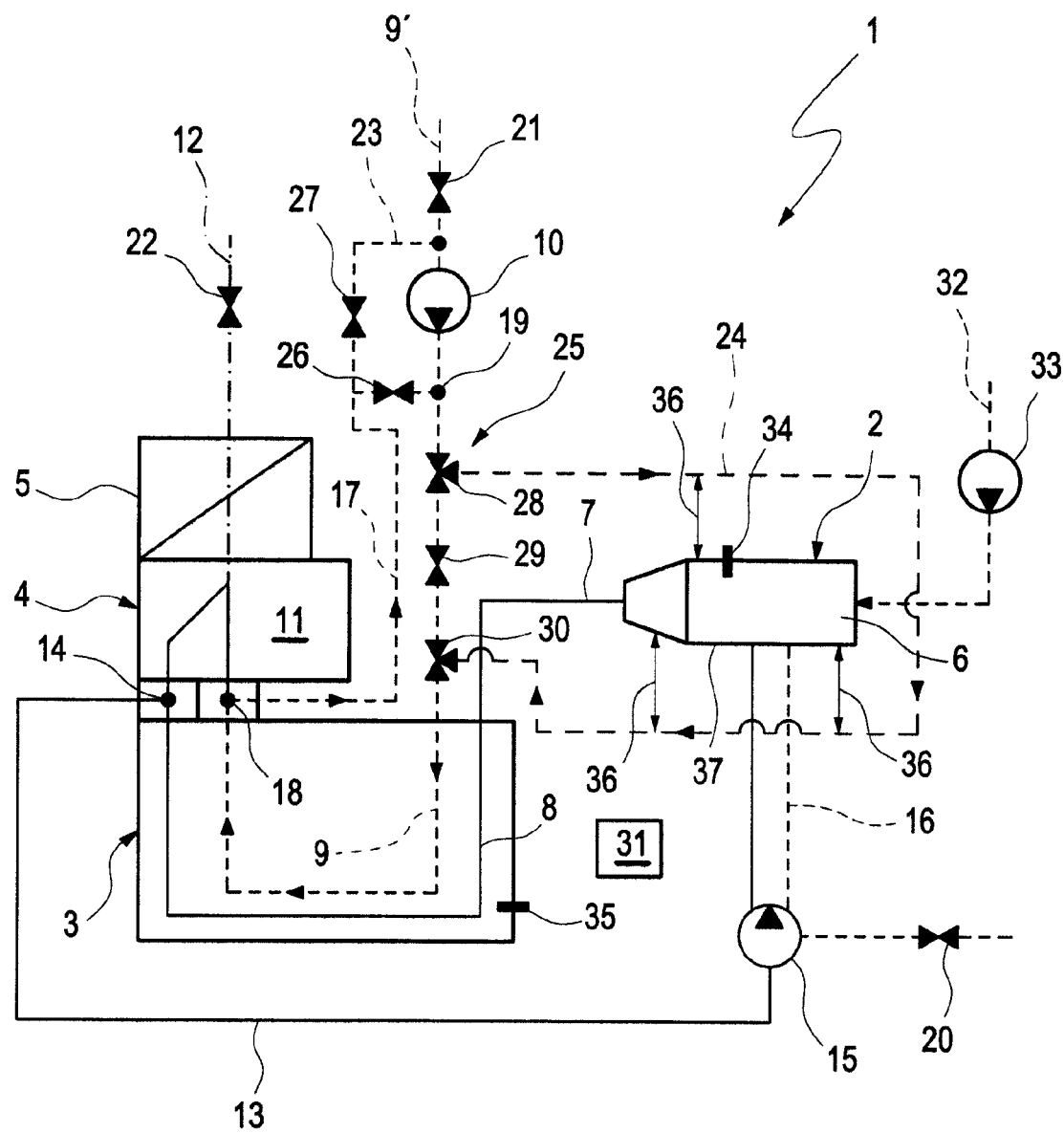
FIG. 2 is a highly simplified, circuit diagram-like schematic view of a fuel cell system of another embodiment according to the invention.

Referring to the drawings in particular, corresponding to FIGS. 1 and 2, a fuel cell system 1, which is shown here only partially, comprises at least one reformer 2 and a fuel cell 3. In addition, a residual gas burner 4 and a heat exchanger 5 are also provided in the example. The fuel cell system 1 is used to generate electric current and can be used preferably in a motor vehicle. It can be used there as an electricity source, which operates independently from an internal combustion engine of the vehicle. Such an additional power generator or auxiliary power generator may also be called an APU (auxiliary power unit).

Reformer 2 is used to generate a reformate gas containing hydrogen gas and carbon monoxide and operates with a catalyst 6 for this. A reformate gas path 7 connects an outlet of the reformer 2 to a corresponding inlet of the fuel cell 3. An anode gas path 8, which is connected to the reformate gas path 7, passes through the fuel cell 3. The reformate gas generated by the reformer 2 is used as anode gas in the fuel cell 3. The anode gas path 8 is separated in the fuel cell 3 by an electrolyte, not shown here, from a cathode gas path 9, which likewise passes through the fuel cell 3. Air or fuel cell air is preferably used as cathode gas. The cathode gas path 9 contains a delivery means 10, for example, a pump or blower, upstream of the fuel cell 3. The delivery means 10 is used to drive the fuel cell air or cathode gas. The cathode gas path 9 upstream of the fuel cell 3 may hereinafter also be called fuel cell air path 9'.

The residual gas burner 4 is arranged downstream of the fuel cell 3 and contains a combustion chamber 11, in which anode waste gas can be burned with cathode waste gas. The anode gas path 8 and the cathode gas path 9 are connected for this to the residual gas burner 4. Cathode gas or cathode waste gas is mixed with anode gas or anode waste gas in the residual gas burner 4 only within the combustion chamber 11. A waste gas path 12 leads away from the residual gas burner 4 in order to remove the hot combustion waste gases of the residual gas burner 4 or combustion chamber 11. The heat exchanger 5 is integrated into the waste gas path 12 and can remove heat from the waste gas of the residual gas burner 4. For example, the heat exchanger 5 can be used to preheat the air fed to the fuel cell 3. The heat exchanger 5 can be integrated for this into the fuel cell air path 9' upstream of the delivery means 10 or downstream of the delivery means 10.

The embodiments being shown here are equipped, besides, with a recirculation path 13, via which it is possible to return anode waste gas to the reformer 2. The recirculation path 13 is connected for this to the anode gas path 8 via a tapping point 14, namely, downstream of the fuel cell 3 and upstream of the combustion chamber 11. The tapping point 14 is positioned in the example between the fuel cell 3 and the residual gas burner 4. An additional delivery means 15, which may be a pump, a blower, or a compressor, may be arranged in the recirculation line 13. This delivery means 15 is a hot gas delivery means in the embodiments being shown, which can drive the hot anode waste gas originating from the fuel cell 3 without cooling it. If a delivery means 15 susceptible to hot gas is to be used, it is conceivable to integrate a heat exchanger, which makes possible a corresponding cooling of the recirculated anode waste gas, in the recirculation line 13 upstream of the delivery means 15. For example, a reformer air path 16, via which air or reformer air is fed to the reformer 2, can be integrated into this recirculation heat exchanger.

The delivery means 15 is used in the example being shown both to drive (feed) the recirculated anode waste gas and to drive the reformer air. The recirculation path 13 and reformer air path 16 are combined for this downstream of the delivery means 15, i.e., they are formed especially by a common line or by a common channel. The recirculation path 13 and reformer air path 16 are connected separately to the delivery means 15 on the suction side. However, the reformer air path may also be connected, in principle, upstream of the delivery means 15 to the reformer air path 16, in which the delivery means 15 is then arranged. Two separate delivery means 15 may also be provided for both paths 13, 16.

To prevent the residual gas burner 4 or the heat exchanger 5 arranged downstream from overheating, it may be necessary to feed in a cooling gas. A cooling gas path 17, via which a suitable cooling gas, preferably air or cooling air, can be fed via an inlet point 18 upstream of the combustion chamber 11, is correspondingly provided here. The cooling gas path 17 is connected for this to the cathode gas path 9 via the inlet point 18, namely, downstream of the fuel cell 3. The inlet point 18 is located in the example between the residual gas burner 4 and the fuel cell 3. The cooling gas path 17 preferably branches off from the fuel cell air path 9' at 19. The branching point 19 is positioned downstream of the delivery means 10, so that this can be used to drive the cooling gas and also to drive the fuel cell air.

A corresponding valve 20, which may be designed as a control valve or shut-off valve, may be arranged in the reformer air path 16 to control or set the quantity of air fed to the reformer 2. The valve is arranged upstream of the delivery means 15 in the example. Furthermore, such a valve 21, by means of which the quantity of air fed to the fuel cell 3 can be set, may likewise be arranged in the fuel cell air path 9' upstream of the fuel cell 3. Valve 21 is arranged upstream of the delivery means 10 in the example. Furthermore, such a valve 22, by means of which the waste gas path can be 12 closed, is also arranged in the waste gas path 12 in the embodiments being shown here. Said valve 22 is located downstream of the heat exchanger 5.

The embodiment shown in FIG. 2 differs from the embodiment shown in FIG. 1 by a bypass path 23, by a coupling path 24 and by a valve arrangement 25. Bypass path 23 bypasses the delivery means 10, which is arranged in the fuel cell air path 9'. Thus, it connects a section of the fuel cell air path 9' located upstream of the delivery means 10 to a section of the fuel cell air path 9' located downstream thereof. Bypass path 23 is connected to the cooling gas path 17 in the example and thus it is connected to the fuel cell air path 9' only indirectly via the branching point 19. Furthermore, branching point 19 comprises here a shut-off valve 26, with which the coupling or branching 19 between the fuel cell air path 9' and the cooling gas path 17 can be closed. Furthermore, bypass path 23 likewise contains a shut-off valve 27, by means of which the bypass path 23 can be closed. The two shut-off valves 26, 27 may also be integrated in a common valve.

Coupling path 24 branches off from the fuel cell air path 9' via the valve arrangement 25 and also opens again into the fuel cell air path 9'. The valve arrangement 25 comprises for this a plurality of valves 28, 29, 30. The first valve 28 defines the branching point or controls the branching point, via which coupling path 24 branches off from the fuel cell path 9'. The first valve 28 is designed as a reversing valve. The second valve 29 is arranged in the fuel cell air path 9' between the other two valves 28, 30 of the valve arrangement 25. The second valve 29 is designed as a shut-off valve for closing the fuel cell air line 9'. The third valve 30 defines or controls the inlet point of coupling path 24, via which this [coupling path 24—Tr.Ed.] is returned into the fuel cell air path 9'. By actuating the valve arrangement 25, i.e., the corresponding valves 28, 29, 30, the air being delivered by the delivery means 10 can reach the fuel cell 3 over a direct path or led via the coupling path 24.

Furthermore, a control 31, by means of which the fuel cell system 1 can be operated, is provided in both embodiments. Control 31 is in connection for this with the individual components of the fuel cell system 1 in a suitable manner, for example, via electric signal lines or control lines, which are omitted here for the sake of a simplified view.

The respective control 31 may also be designed or programmed such that it can perform an operating process described below for operating the fuel cell system 1.

Reformer 2 generates the reformate gas containing hydrogen gas during a normal operation from a hydrocarbon fuel, which is fed via a corresponding feed means 32 with a corresponding delivery means 33. This reformate gas can be converted into electric energy in the fuel cell 3.

If no electricity is needed, the fuel cell system 1 is switched off. Control 31 then activates a warm-holding mode. During this warm-holding mode, control 31 ensures that heat transfer takes place from the fuel cell 3 to the reformer 2. This heat transfer to the reformer 2 can be carried out specifically by means of control 31 such that the temperature of the reformer 2 does not drop below a predetermined minimum warm-holding temperature of the reformer 2. The reformer minimum warm-holding temperature may be, for example, 300° C. A corresponding temperature sensor 34, which may be connected to the control 31 in a suitable manner, not shown here, may be provided to monitor this temperature. Moreover, control 31 may be designed such that it carries out the heat transfer specifically only until the temperature of the fuel cell 3 has dropped below a minimum warm-holding temperature of the fuel cell 3. The fuel cell minimum warm-holding temperature may be, for example, 500° C. The temperature of the fuel cell 3 can be monitored by means of a corresponding temperature sensor 35, which is likewise in connection with control 31 in a suitable manner, which is not shown here. The heat being stored in the fuel cell 3 can be transferred in this manner to the reformer 2 in a well-metered form in such a way that the longest possible time period is obtained during which both the reformer 2 and the fuel cell 3 have at least their respective minimum warm-holding temperatures.

The heat transfer from the fuel cell 3 to the reformer 2 preferably takes place via an educt circuit, in which an educt of the fuel cell system 1 circulates between the fuel cell 3 and the reformer 2.

In the embodiment shown in FIG. 1 this educt circuit comprises the anode gas path 8, the recirculation path 13 and the reformate gas path 7. The delivery means 15 arranged in the recirculation path 13 can be used to drive the educt contained in said educt circuit 8-13-7. The educt being delivered now contains, on the one hand, the reformate gas contained in the reformate gas path 7 as well as the anode gas contained in the anode gas path 8 and, in addition, the anode waste gas contained in the recirculation path 13. In addition, a suitable quantity of reformer air may belong to the educt, which quantity may be present, for example, from between the delivery means 15 and the reformer 2. The embodiment shown in FIG. 1 can thus be embodied in an especially simple manner with means already present in the fuel cell system 1.

To prevent air from being sucked in via the cathode gas path 9 or via the cooling gas path 17, the valve 21 arranged in the fuel cell air path 9' can be closed. In addition, to prevent waste gas from being sucked in or to prevent ambient air from being sucked through the waste gas path 12, the waste gas path 12 can likewise be closed by means of the valve 22 arranged therein. It is also advantageous to close the reformer air path 16 upstream of the delivery means 15 by means of valve 20 in order to prevent the undesired sucking in of air at this point as well.

FIG. 2 shows another embodiment, in which the educt circuit comprises the cathode gas path 9, cooling gas path 17 and coupling path 24. A corresponding delivery means may again be present in the educt circuit to drive the educt, which consists essentially of air only here. If the delivery means 10 of the fuel cell air path 9', which delivery means is present in the fuel cell system 1 anyway, is to be used, the bypass path 23 must be additionally activated, and the connection between the cooling gas path 17 and the fuel cell air path 9' must be additionally closed by means of valve 26. The delivery means 10 will then suck the cathode gas, i.e., air, from the fuel cell 3 via the bypass path 23 and via the fresh gas path 17 and deliver it back into the fuel cell 3 via the coupling path 24. Coupling path 24 is coupled with the reformer 2 in a suitable manner in a heat-transferring manner. A corresponding heat-transferring coupling is indicated by double arrows 36 in FIG. 2. For example, the coupling path 24 may bypass a housing 37 of reformer 2. A kind of air jacket, which forms part of the coupling path 24, may be integrated in this housing 37. Coupling path 24 is connected in the example to the fuel cell air path 9' via the valve arrangement 25. Provisions may also be made in an alternative embodiment to connect the coupling path 24 to the cooling gas path 17 via the valve arrangement 25.

The fuel cell air path 9' upstream of the bypass path 23 and the exhaust gas path 12 are closed by means of the corresponding valves 21 and 22 in the embodiment shown in FIG. 2 as well in order to prevent infiltrated air or exhaust gas from being sucked in. Furthermore, the reformer air path 16 can also be closed by means of valve 20 in order to prevent anode gas from being sucked, for example, via the tapping point 14 to the cathode side.

As soon as heat is no longer available, which could be transferred from the fuel cell 3 to the reformer 2 in order to maintain the latter at its minimum warm-holding temperature, provisions may be made in another embodiment for feeding in a hydrocarbon fuel, for example, diesel fuel, gasoline, natural gas and the like, to the reformer 2 in order to react this at the catalyst 6 of the reformer 2 by means of air in an exothermal reaction. The air may be fed now, for example, via the reformer air path 16 and metered by means of valve 20. Reformer 2 can then be operated especially as a burner, so that the fuel being fed will be oxidized more or less completely at catalyst 6. It is also possible, as an alternative, to operate the reformer 2 in an operating state of the reformer in which it oxidizes the fuel being fed only partially and generates the desired reformate gas. This external fuel feed may be preceded by the feed of air only via the reformer air path 16, which makes it possible, at least in the embodiment shown in FIG. 1, to react the hydrogen contained in the educt exothermally at the catalyst 6 of reformer 2.

While specific embodiments of the invention have been described in detail to illustrate the application of the principles of the invention, it will be understood that the invention may be embodied otherwise without departing from such principles.

What is claimed is:

1. A process for operating a fuel cell system, the process comprising the steps of:
   providing that the fuel cell system comprises at least one fuel cell as well as at least one reformer;
   providing a control;
   operating the fuel cell; and
   establishing a warm-holding mode with said control, in which heat transfer takes place from the fuel cell to the reformer and activating the warm-holding mode with said control after the fuel cell system has been switched off.

2. A process in accordance with claim 1, wherein the heat transfer to the reformer is carried out such that the temperature of the reformer does not drop below a minimum warm-holding temperature of the reformer.

3. A process in accordance with claim 1, wherein the heat transfer is carried out until the temperature of the fuel cell has dropped below a minimum warm-holding temperature of the fuel cell.

4. A process in accordance with claim 1, wherein the heat transfer takes place via an educt circuit, in which an educt circulates between the fuel cell and the reformer.

5. A process in accordance with claim 4, wherein the educt circuit comprises an anode gas path passing through the fuel cell, a recirculation path returning anode waste gas from the fuel cell to the reformer, and a reformate gas path sending reformate gas from the reformer to the fuel cell.

6. A process in accordance with claim 5, wherein a delivery means is arranged in the recirculation path and the delivery means is used to drive the educt in the educt circuit.

7. A process in accordance with claim 4, wherein the educt circuit comprises a cathode gas path passing through the fuel cell, a cooling gas path sending cooling gas to a residual gas burner arranged downstream of the fuel cell, and a coupling path coupled with the reformer in a heat-transferring manner.

8. A process in accordance with claim 7, wherein the coupling path is activated and deactivated by means of a valve arrangement.

9. A process in accordance with claim 7, wherein the coupling path is connected to the cooling gas path via a valve arrangement.

10. A process in accordance with claim 7, wherein the educt circuit further comprises:
    a section of an air path sending air to the fuel cell; and
    a coupling path connected to the air path via a valve arrangement.

11. A process in accordance with claim 7, wherein a delivery means is arranged in the coupling path or in the cooling gas path or in the air path to drive the educt in the educt circuit.

12. A process in accordance with claim 1, wherein at least one of:
    a burner waste gas path, which removes burner waste gas from a residual gas burner arranged downstream of the fuel cell is closed during the warm-holding mode; and
    a fuel cell air path, which sends air to the fuel cell, is closed during the warm-holding mode; and
    a reformer air path, which sends air to the reformer, is closed during the warm-holding mode.

13. A fuel cell system, comprising:
    a fuel cell;
    a reformer;
    a control for operating the fuel cell system including operating the fuel cell and the reformer, said control being equipped or programmed for establishing a warm-holding mode and establishing the warm-holding mode in which said control controls heat transfer from said fuel cell to said reformer and heat transfer takes place from said fuel cell to said reformer and said control activating the warm-holding mode after said fuel cell has been switched off.

14. A fuel cell system in accordance with claim 13, wherein said control controls heat transfer to said reformer to at least one of:
    prevent the temperature of said reformer from dropping below a minimum warm-holding temperature of said reformer; and
    until the temperature of said fuel cell has dropped below a minimum warm-holding temperature of said fuel cell.

15. A fuel cell system in accordance with claim 13, further comprising an educt circuit wherein the heat transfer takes place via said educt circuit, in which an educt circulates between said fuel cell and said reformer.

16. A fuel cell system in accordance with claim 15, further comprising a delivery means to feed the educt in the educt circuit, wherein said educt circuit comprises an anode gas path passing through said fuel cell, a recirculation path returning anode waste gas from said fuel cell to said reformer, and a reformate gas path sending reformate gas from said reformer to said fuel cell, said delivery means being arranged in said recirculation path.

17. A fuel cell system in accordance with claim 15, wherein said educt circuit comprises a cathode gas path passing through said fuel cell, a cooling gas path sending cooling gas to a residual gas burner arranged downstream of said fuel cell, and a coupling path coupled with said reformer in a heat-transferring manner, wherein said coupling path is activated and deactivated by means of a valve arrangement and said coupling path is connected to the cooling gas path via said valve arrangement.

18. A fuel cell system in accordance with claim 17, wherein the educt circuit further comprises:
    a section of an air path sending air to said fuel cell; and
    a coupling path connected to the air path via a valve arrangement.

19. A fuel cell system in accordance with claim 17, wherein a delivery means is arranged in the coupling path or in the cooling gas path or in the air path to drive the educt in the educt circuit.

20. A fuel cell system in accordance with claim 13, wherein at least one of:
    a burner waste gas path, which removes burner waste gas from a residual gas burner arranged downstream of said fuel cell is closed by said control during the warm-holding mode; and
    a fuel cell air path, which sends air to said fuel cell, is closed by said control during the warm-holding mode; and
    a reformer air path, which sends air to said reformer is closed by said control during the warm-holding mode.

21. A fuel cell system, comprising:
    a fuel cell;
    a reformer;
    a fluid circuit for circulating a fluid between said fuel cell and said reformer for transferring heat, via a fluid in said fluid circuit, between said fuel cell and said reformer;
    a fluid delivery device for feeding the fluid in said fluid circuit;
    a control operating the fuel cell system including operating said fuel cell and said reformer, said control establishing a warm-holding mode in which said control controls said fluid delivery device to control heat transfer from said fuel cell to said reformer and heat transfer takes place from said fuel cell to said reformer and said control activating the warm-holding mode after said fuel cell has been switched off.

* * * * *